(12) United States Patent
Chiang

(10) Patent No.: US 8,065,780 B2
(45) Date of Patent: Nov. 29, 2011

(54) COLLAPSIBLE DEVICE

(75) Inventor: Chen-Wei Chiang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 394 days.

(21) Appl. No.: 12/477,870

(22) Filed: Jun. 3, 2009

(65) Prior Publication Data

US 2010/0269298 A1  Oct. 28, 2010

(30) Foreign Application Priority Data

Apr. 28, 2009 (CN) .......................... 2009 2 302657 U

(51) Int. Cl.
  *E05D 15/06* (2006.01)
(52) U.S. Cl. ................. 16/361; 16/316; 16/312; 16/318
(58) Field of Classification Search .............. 16/357, 16/360, 361, 362, 387, 381, 386, 309, 312, 16/316, 318, 378
  See application file for complete search history.

(56) References Cited

U.S. PATENT DOCUMENTS

| | | | | |
|---|---|---|---|---|
| 651,876 A | * | 6/1900 | Meyer | 16/351 |
| 991,512 A | * | 5/1911 | Johnstone | 16/316 |
| 1,691,759 A | * | 11/1928 | Fischer | 16/314 |
| 2,683,892 A | * | 7/1954 | Gorman | 16/312 |
| 2,860,370 A | * | 11/1958 | Honnay | 16/309 |
| 4,089,084 A | * | 5/1978 | Droz | 16/357 |
| 4,391,020 A | * | 7/1983 | Hsu | 16/314 |
| 5,367,745 A | * | 11/1994 | Roloff | 16/312 |
| 5,600,868 A | * | 2/1997 | Tourville et al. | 16/277 |
| 6,647,593 B2 | * | 11/2003 | Iguchi et al. | 16/386 |
| 7,047,598 B2 | * | 5/2006 | Huang | 16/312 |
| 7,565,717 B2 | * | 7/2009 | Duan et al. | 16/303 |
| 7,913,356 B2 | * | 3/2011 | Duan et al. | 16/303 |
| 2006/0085947 A1 | * | 4/2006 | Ge et al. | 16/303 |
| 2008/0263827 A1 | * | 10/2008 | Hsu et al. | 16/362 |
| 2009/0049649 A1 | * | 2/2009 | Lin | 16/387 |

* cited by examiner

*Primary Examiner* — Victor Batson
*Assistant Examiner* — Emily Morgan
(74) *Attorney, Agent, or Firm* — Altis Law Group, Inc.

(57) ABSTRACT

A collapsible device includes a base, a cover, and a hinge. The hinge includes a first connecting member fixed to the base, a second connecting member defining a through hole, a sleeve member fixed to the second connecting member, a shaft movably mounted to the first connecting member, and a fastener. The sleeve member defines a spiral slide groove therein. A clamping protrusion extends from the first connecting member for slidably engaging in the slide groove. The shaft includes a fixing portion rotatably passed through the sleeve member and the through hole. The fastener is fixed to a distal end of the fixing portion. The second connecting member is fixed to the cover. During the rotation of the cover relative to the base via the hinge, the cover is synchronously moved transversely relative to the base along the axial direction of the hinge.

15 Claims, 4 Drawing Sheets

COLLAPSIBLE DEVICE

CROSS-REFERENCE TO RELATED APPLICATION

This application is related to a co-pending U.S. patent application, application Ser. No. 12/4,755,509, filed concurrently with the present application, entitled "HINGE", which is assigned to the same assignee as that of the present application. The inventor of the co-pending application is Chen-Wei Chiang. The Specification and Drawings of the co-pending application is incorporated herein by reference.

BACKGROUND

1. Technical Field

The disclosure relates to a collapsible device.

2. Description of Related Art

A collapsible device, such as a notebook computer, or a clamshell mobile phone, generally including a base, a cover, and a hinge often used to interconnect the base and the cover. The hinge allows the cover to be rotatable with respect to the base, and to be folded with the base for saving space. However, the cover can only be rotated relative to the base, but can not be transversely moved along the base, which is quite inconvenient for users.

DETAILED DESCRIPTION

Figure 1:
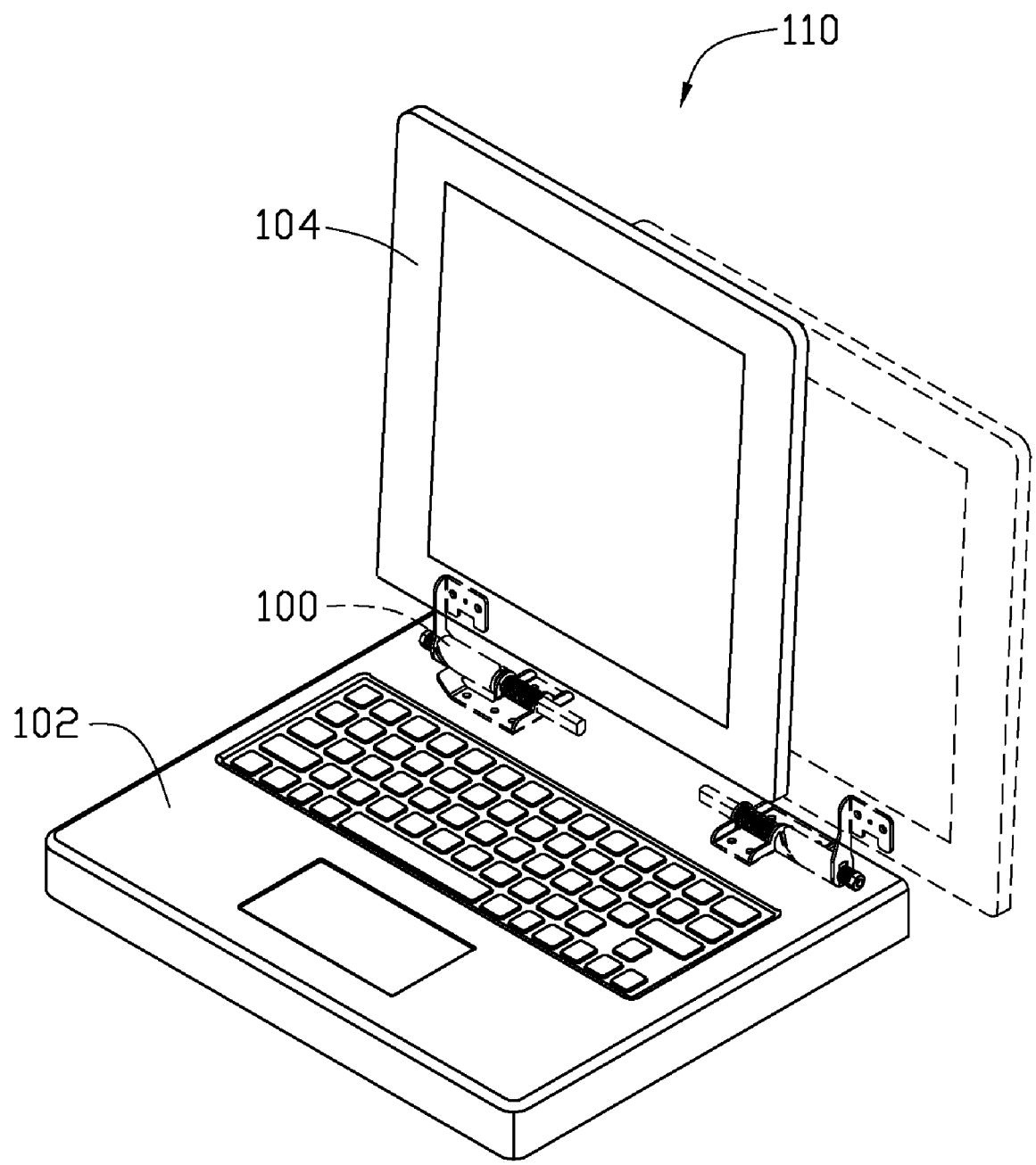
FIG. 1 is an isometric view of an exemplary embodiment of a collapsible device, the collapsible device including a cover, a main body, and a hinge connected between the cover and the main body.

Referring to FIG. 1, an exemplary embodiment of collapsible device 110 includes a main body 102, a cover 104 pivotably mounted to the main body 102, and a hinge 100 connected between the main body 102 and the cover 104. Generally, the cover 104 can be located between a first position and a second position relative to the main body 102, the first and second positions respectively shown in real lines and broken lines in FIG. 1. During rotation of the cover 104 relative to the main body 102, the cover 104 will transversely move between the first and second positions along the axial direction of the hinge 100.

Figure 2:
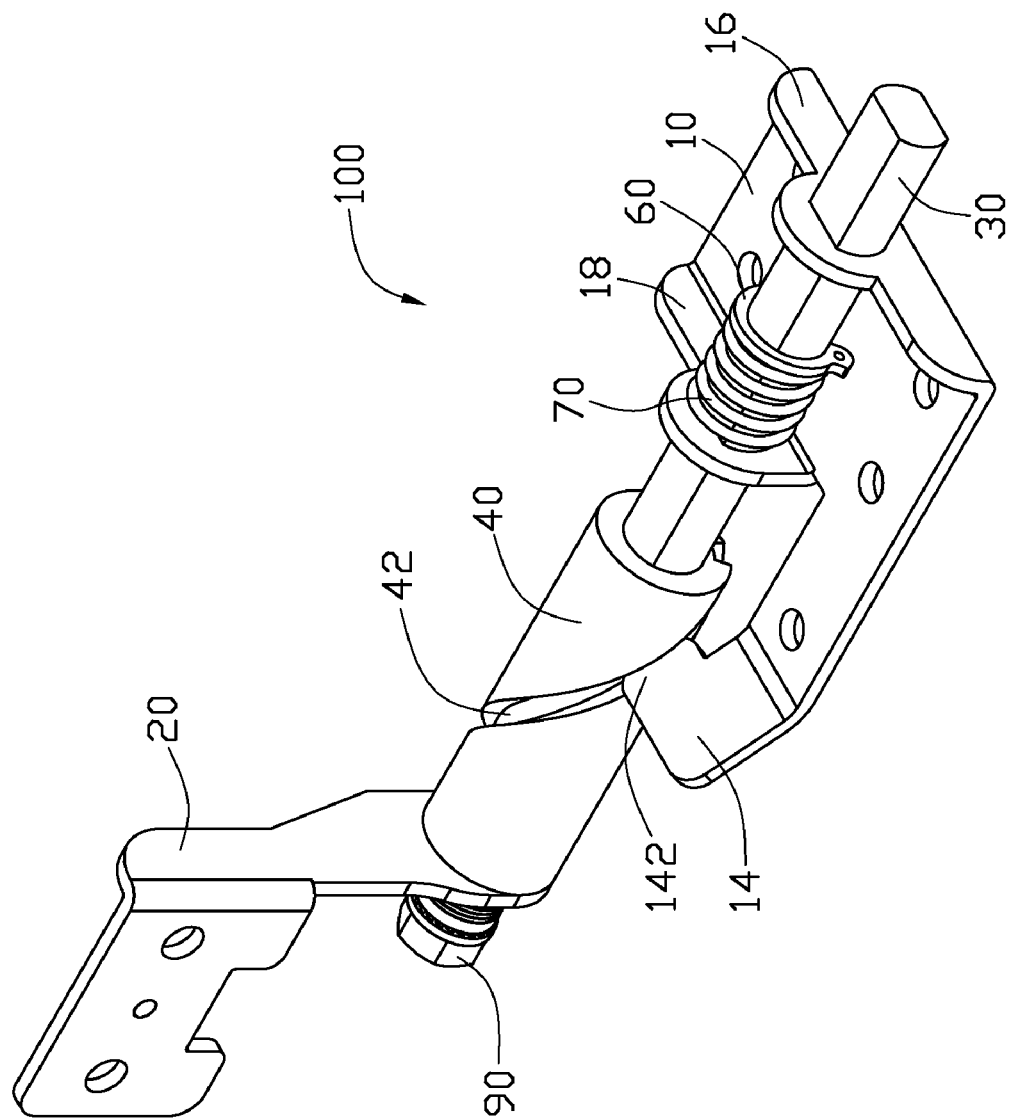
FIG. 2 is an enlarged, isometric view of the hinge of FIG. 1.
Figure 3:
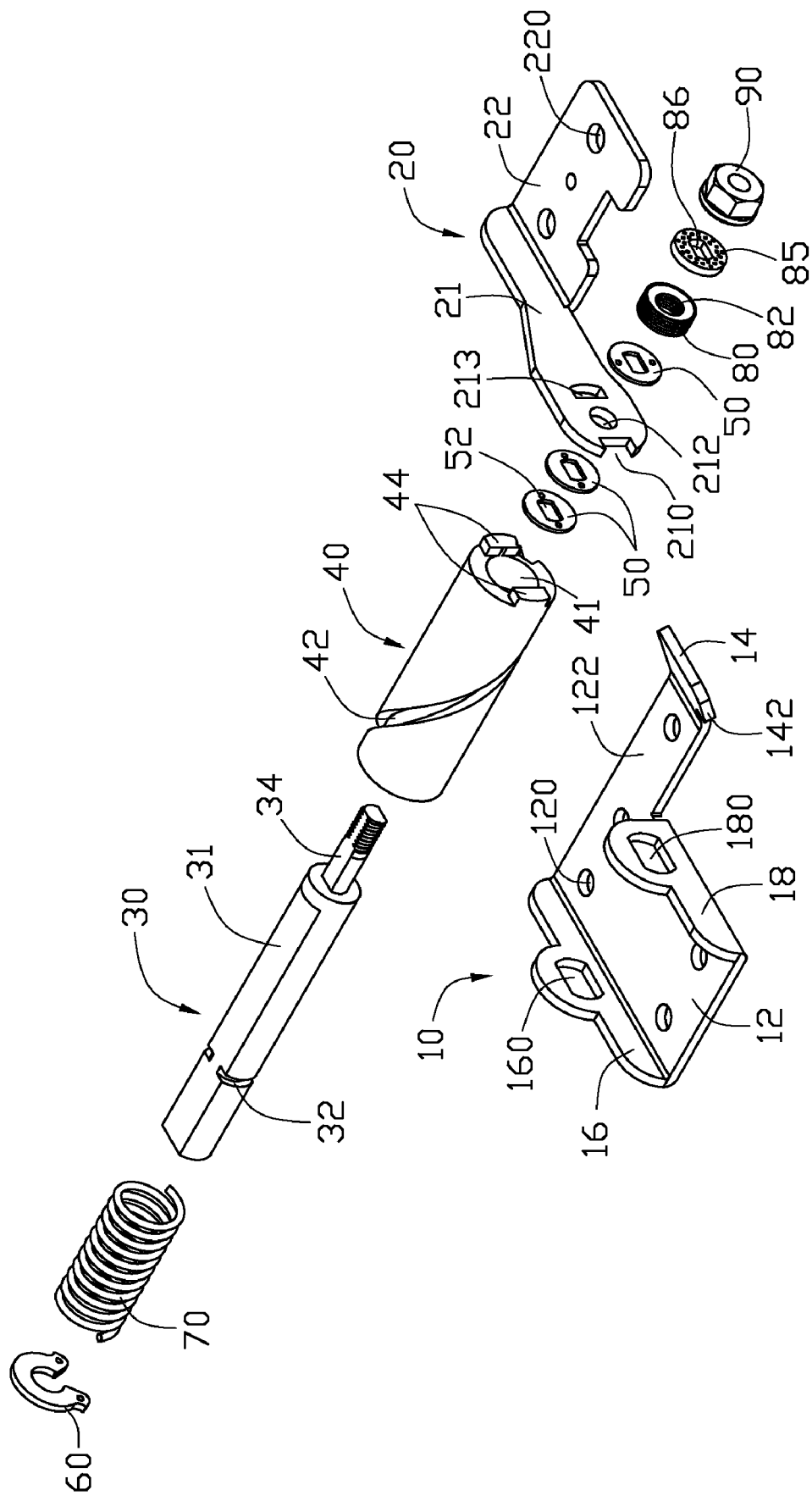
FIG. 3 is an exploded, isometric view of the hinge of FIG. 2.

Referring to FIGS. 2 and 3, the hinge 100 includes a first connecting member 10, a second connecting member 20, a shaft 30, a sleeve member 40, a plurality of friction members 50, a C-shaped clamping member 60, a resilient member 70, a biasing member 80 formed by a plurality of stacked elastic rings, a washer 85, and a fastener 90. In the illustrated embodiment, the resilient member 70 is a coil spring, and the fastener 90 is a nut.

The first connecting member 10 includes a fixing body 12 defining a plurality of fixing holes 120 therein, and an interfering portion 122 horizontally extending from a first side of the fixing body 12, adjacent to a first end of the fixing body 12. The fixing body 12 includes a first connecting sidewall 16 perpendicularly extending from a second side opposite to the first side of the fixing body 12, and a second connecting sidewall 18 perpendicularly extending from the first side of the fixing body 12, adjacent to a second end opposite to the first end of the fixing body 12. The first and second connecting sidewalls 16, 18 define two double-D shaped through holes 160, 180 respectively, the through holes 160, 180 aligning with each other. A distal end of the interfering portion 122 slantingly extends upwards to form an interfering block 14, and a clamping protrusion 142 extends from a side of the interfering block 14 adjacent to the through holes 160, 180.

The second connecting member 20 includes a connecting block 22 defining a plurality of fixing holes 220 therein, and a fixing portion 21 perpendicularly extending from an end of the connecting block 22. An end of the fixing portion 21 extends away from the connecting block 22. The end of the fixing portion 21 defines a through hole 212, a first fixing slot 210 and a second fixing slot 213. The first and the second fixing slots 210, 213 are opposite to each other across the through hole 212.

The shaft 30 includes a shaft body 31, and a fixing portion 34 extending from a first end of the shaft body 31. A portion neighboring a second end opposite to the first end of the shaft body 31 has a double-D shaped cross-section, corresponding to the through holes 160, 180 of the first and second connecting sidewalls 16, 18, therefore, the shaft body 31 can be slidably passed through the through holes 160, 180. The shaft body 31 defines a clamping slot 32 along a circumference of the shaft body 31, away from the fixing portion 34. The fixing portion 34 has a double-D shaped cross-section, and forms a threaded portion (not labeled) on a circumference of a distal end of the fixing portion 34, for engaging with the fastener 90.

The sleeve member 40 axially defines a through hole 41 through a first end to a second end opposite to the first end, for the shaft 30 to pass therethrough. A spiral slide groove 42 is defined in a circumference of the sleeve member 40, from the first end to the second end of the sleeve member 40. Two clamping posts 44 extend from an end surface at the second end of the sleeve member 40, opposite to each other across the through hole 41. Each of the clamping posts 44 has a shape, corresponding to a corresponding one of the first and the second fixing slots 210, 213 of the second connecting member 20. Thereby, the clamping posts 44 can be engaged in the first and the second fixing slots 210, 213 respectively, for fixing the sleeve member 40 to the second connecting member 20.

Each friction member 50 defines a double-D shaped fixing hole 52, for unrotatably receiving the fixing portion 34 of the shaft 30. Each elastic ring of the biasing member 80 is to provide elasticity along an axial direction, to tighten the plurality of friction members 50, the second connecting member 20, and the sleeve member 40. The biasing member 80 defines a round through hole 82, allowing the fixing portion 34 of the shaft 30 to rotatably pass therethrough.

The washer 85 defines a double-D shaped through hole 86 in a center thereof, for unrotatably fitting about the fixing portion 34 of the shaft 30.

Figure 4:
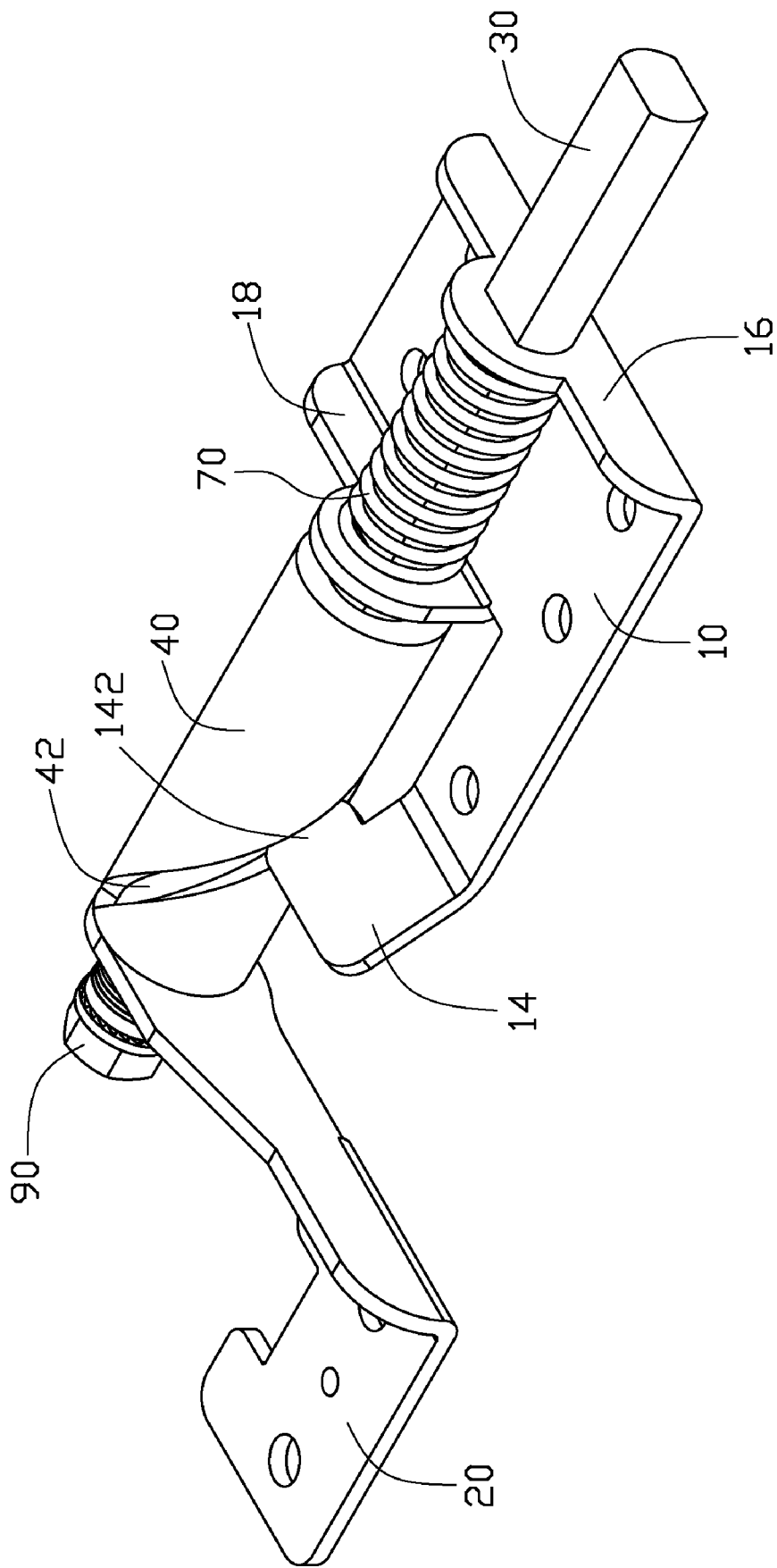
FIG. 4 is similar to FIG. 2, but viewed from another perspective.

Referring to FIGS. 1, 2, and 4, in assembly of the hinge 100, the resilient member 70 is placed between the first and second connecting sidewalls 16, 18. The shaft body 31 of the shaft 30 is passed through the through hole 180 of the first connecting member 10, the resilient member 70, and the through hole 160 of the first connecting member 10 in that order. The clamping member 60 is clamped in the clamping slot 32, with opposite sides of the clamping member 60 resisting against the first connecting sidewall 16 of the first connecting member 10 and the resilient member 70. The fixing portion 34 of the shaft 30 is passed through the through hole 41 of the sleeve member 40, the fixing holes 52 of some friction members 50, the through hole 212 of the second connecting member 20, the fixing holes 52 of the other friction members 50, the round through hole 82 of the biasing member 80, and the through hole 86 of the washer 85 in that turn, to engage in the fastener 90 via the threaded portion of the fixing portion 34, for preventing the washer 85, the biasing member 80, the plurality of friction members 50, the sleeve member 40, and the second connecting member 20 from disengaging from the shaft 30. The sleeve member 40 is fixed to the second connecting member 20 via engagement between the clamping posts 44 of the sleeve 40 and the first and second fixing slots 210, 213, respectively. The clamping protrusion 142 of the first connecting member 10 is slidably engaged in the slide groove 42 of the sleeve member 40.

The first connecting member 10 is fixed to the main body 102 via the plurality of fixing holes 120, and the second connecting member 20 is fixed to the cover 104 via the plurality of fixing holes 220. In use, during the rotation of the cover 104 relative to the main body 102, the second connecting member 20 is rotated relative to the first connecting member 10, together with the sleeve member 40. As a result, the clamping protrusion 142 of the first connecting member 10 slides in the slide groove 42, to drive the sleeve member 40 to move away from or towards the first connecting member 10 along the axial direction of the shaft 30. As a result, the cover 104 is transversely moved relative to the main body 102 along the axial direction of the shaft 30. In this process, the shaft 30 moves together with the first connecting member 10, because of the clamping member 60. The resilient member 70 can be distorted or restored. The resilient member 70 can provide elastic force along an axial direction of the shaft 30 to keep the components of hinge 100 in proper engagement. When the clamping protrusion 142 of the first connecting member 10 slides in the slide groove 42 to move to the first end of the sleeve member 40, the cover 104 is located at the first position. When the clamping protrusion 142 of the first connecting member slides in the slide groove 42 to move to the second end of the sleeve member 40, the cover 104 is located at the second position.

It is believed that the present embodiments and their advantages will be understood from the foregoing description, and it will be apparent that various changes may be made thereto without departing from the spirit and scope of the description or sacrificing all of its material advantages, the examples hereinbefore described merely being exemplary embodiments.

What is claimed is:

1. A collapsible device comprising:
a main body;
a cover; and
a hinge comprising:
a first connecting member comprising a clamping protrusion;
a second connecting member defining a through hole;
a sleeve member fixed to the second connecting member, the sleeve member defining
a spiral slide groove in a circumference of the sleeve member from a first end to a second end of the sleeve member, to slidably receive the clamping protrusion of the first connecting member for driving the second connecting member to move transversely relatively to the first connecting member to move;
a shaft slidably mounted to the first connecting member and comprising a fixing portion, wherein the fixing portion is rotatably passed through the sleeve member and the through hole of the second connecting member; and
a fastener fixed to a distal end of the fixing portion to prevent the sleeve member and the second connecting member from disengaging from the shaft;
wherein the first connecting member is fixed to the main body, and the second connecting member is fixed to the cover; the second connecting member defines a first fixing slot and a second fixing slot, two clamping posts extend from an end surface of the sleeve member, engaging with the first and second fixing slots, respectively; when during the rotation of the cover relative to the main body via the hinge, the cover is synchronously moved transversely relative to the main body along the axial direction of the hinge.

2. The collapsible device of claim 1, wherein the shaft further comprises a shaft body, the fixing portion extends from the shaft body, the shaft body is slidably mounted to the first connecting member.

3. The collapsible device of claim 2, wherein the first connecting member comprises a first connecting sidewall and a second connecting sidewall opposite and parallel to the first connecting sidewall, each of the first and second connecting sidewalls defines a through hole for the shaft body slidably passing therethrough.

4. The collapsible device of claim 3, wherein the first connecting member further comprises a fixing body, the first and second connecting sidewalls perpendicularly extend from opposite sides of the fixing body, the fixing body is fixed to the main body.

5. The collapsible device of claim 4, wherein the fixing body comprises an interfering portion horizontally extending from the fixing body, a distal end of the interfering portion slantingly extends upwards to form an interfering block, the clamping protrusion extends from the interfering block.

6. The collapsible device of claim 3, wherein the hinge further comprises a clamping member and a resilient member, the shaft body defines a clamping slot for engaging with the clamping member, the resilient member fits about the shaft body and located between the first and second sidewalls, and opposite sides of the clamping member respectively resist against the first connecting sidewall and the resilient member.

7. The collapsible device of claim 1, wherein the sleeve member axially defines a through hole for the shaft rotatably passing therethrough, and the clamping posts are opposite to each other across the through hole of the sleeve member.

8. The collapsible device of claim 1, wherein the hinge further comprises a plurality of friction members fitting about the fixing portion of the shaft and respectively located at opposite sides of the second connecting member.

9. The collapsible device of claim 8, wherein the hinge further comprises a biasing member rotatably fitting about the fixing portion of the shaft, and a washer fixed to the fixing portion, the biasing member is sandwiched between the washer and one of the friction members.

10. The collapsible device of claim 9, wherein the washer is sandwiched between the biasing member and the fastener.

11. A collapsible device comprising:
a hinge comprising:
a first connecting member, a clamping protrusion extending from the first connecting member;
a sleeve member defining a spiral slide groove in a circumference from a first end to a second end of the sleeve member, to slidably receive the clamping protrusion of the first connecting member;

a second connecting member fixed to the sleeve member; and a shaft, wherein a first end of the shaft is slidably and unrotatably mounted to the first connecting member, and a second end of the shaft is rotatably passed through the sleeve member to be rotatably mounted to the second connecting member;

a main body fixed to the first connecting member; and a cover fixed to the second connecting member;

wherein the second connecting member defines a first fixing slot and a second fixing slot, two clamping posts extend from one end of the sleeve member for engaging with the first and second fixing slots respectively; during the rotation of the cover relative to the main body, the clamping protrusion slides in the slide groove, together with the shaft body sliding relative to the first connecting member, to drive the sleeve member and the second connecting member to move along the axial direction of the shaft.

12. The collapsible device of claim 11, wherein the first connecting member comprises a fixing body, and an interfering portion extending from the fixing body, a distal end of the interfering portion slantingly extends upwards to form an interfering block, the clamping protrusion extends from the interfering block.

13. The collapsible device of claim 12, wherein the fixing body comprises a first connecting sidewall and a second connecting sidewall opposite and parallel to the first connecting sidewall, each of the first and second connecting sidewalls defines a through hole for the shaft slidably and unrotatably passing therethrough.

14. The collapsible device of claim 13, further comprising a clamping member and a resilient member, wherein the shaft defines a clamping slot for engaging with the clamping member, the resilient member fits about the shaft and located between the first and second connecting sidewalls, and opposite sides of the clamping member respectively resist against and the resilient member and one of the first and second connecting sidewalls.

15. The collapsible device of claim 11, wherein the sleeve member axially defines a through hole for the shaft rotatably passing therethrough, and the clamping posts are opposite to each other across the through hole of the sleeve member.

* * * * *